May 12, 1964

F. E. ALTMAN ETAL 3,133,142

FOUR COMPONENT OBJECTIVE

Filed Nov. 21, 1960

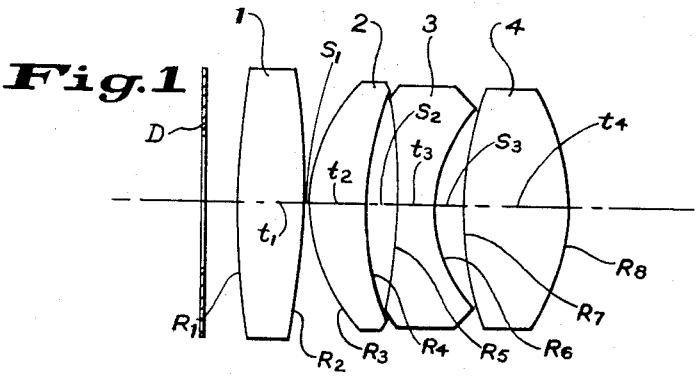

Fig.2

| EQUIVALENT FOCUS = 100 mm. | | | | f/1.4 |
|---|---|---|---|---|
| LENS | N | V | RADII | THICKNESSES |
| 1 | 1.697 | 56 | $R_1 = +288.7$ mm. | $t_1 =$ 20.0 mm. |
|  |  |  | $R_2 = -288.7$ | $S_1 =$ 1.4 |
| 2 | 1.697 | 56 | $R_3 = +54.3$ | $t_2 =$ 17.0 |
|  |  |  | $R_4 = +132.8$ | $S_2 =$ 8.4 |
| 3 | 1.720 | 29 | $R_5 = -138.9$ | $t_3 =$ 9.9 |
|  |  |  | $R_6 = +42.2$ | $S_3 =$ 9.1 |
| 4 | 1.697 | 56 | $R_7 = +115.4$ | $t_4 =$ 31.6 |
|  |  |  | $R_8 = -55.7$ |  |

Fig.3

| EQUIVALENT FOCUS = 100 mm. | | | | f/1.4 |
|---|---|---|---|---|
| LENS | N | V | RADII | THICKNESSES |
| 1 | 1.697 | 56 | $R_1 = +258.4$ mm. | $t_1 =$ 20.1 mm. |
|  |  |  | $R_2 = -258.4$ | $S_1 =$ 1.5 |
| 2 | 1.697 | 56 | $R_3 = +48.6$ | $t_2 =$ 17.1 |
|  |  |  | $R_4 = +87.81$ | $S_2 =$ 8.87 |
| 3 | 1.720 | 29 | $R_5 = -308.7$ | $t_3 =$ 12.2 |
|  |  |  | $R_6 = +37.3$ | $S_3 =$ 8.64 |
| 4 | 1.697 | 56 | $R_7 = +93.75$ | $t_4 =$ 31.7 |
|  |  |  | $R_8 = -62.7$ |  |

*Fred E. Altman*
*Laura W. Von Halla*
INVENTORS

BY *R. Frank Smith*
*E. M. Emerson Holmes*
ATTORNEYS

United States Patent Office 3,133,142
Patented May 12, 1964

3,133,142
FOUR COMPONENT OBJECTIVE
Fred E. Altman and Laura W. Von Halla, Rochester, N.Y., assignors to Eastman Kodak Company, Rochester, N.Y., a corporation of New Jersey
Filed Nov. 21, 1960, Ser. No. 70,743
3 Claims. (Cl. 88—57)

This invention relates to photographic objectives.

The object of the invention is to provide a four-element, high-aperture objective, particularly suitable for use in relatively short focal lengths on cinematographic cameras, which will provide good over-all correction for aberrations and at the same time be economical to manufacture.

Objective lenses ordinarily have the iris diaphragm, if one is provided, inserted between two lens components somewhere within the lens. It is sometimes highly desirable to locate the iris diaphragm or other stop, such as a shutter, completely outside the objective lens assembly for reasons of practicability or convenience in mechanical structure. An attempt to place the diaphragm outside the ordinary lens, either before or behind, usually results in serious vignetting and consequent loss of picture quality.

We have found that an objective may be designed having good performance at high aperture and a field angle of $\pm 16°$ even when the diaphragm is placed in front of the objective. An objective according to the invention is of simple construction and is economical to manufacture and still gives excellent performance on 8 mm. movie cameras.

The improvement in the objective of the invention is brought about largely by a thickening of the glass elements relative to the focal length of a four-element (K-type) objective and a simultaneous decrease in the enclosed airspace. Best results are obtained if the space which ordinarily is a diaphragm space in the K-type lens is reduced to less than one-tenth of the equivalent focal length of the lens and the four glass elements are each increased in thickness to greater than one-tenth of the equivalent focal length, with the rear element preferably being made thicker than three-tenths of the equivalent focal length.

In the drawing, FIGURE 1 shows the general construction of a lens according to the invention, and FIGURES 2 and 3 are tables giving the construction values (for a focal length of 100 mm.) for two very successful specific embodiments of the invention.

The tables of FIGURES 2 and 3 are repeated here for convenience:

*Table 1*
[Equivalent Focus=100 mm. $f/1.4$]

| Lens | N | V | Radii, mm. | Thicknesses, mm. |
|---|---|---|---|---|
| 1 | 1.697 | 56 | $R_1=+288.7$ | $t_1=20.0$ |
|   |       |    | $R_2=-288.7$ | $S_1=1.4$ |
| 2 | 1.697 | 56 | $R_3=+54.3$  | $t_2=17.0$ |
|   |       |    | $R_4=+132.8$ | $S_2=8.4$ |
| 3 | 1.720 | 29 | $R_5=-138.9$ | $t_3=9.9$ |
|   |       |    | $R_6=+42.2$  | $S_3=9.1$ |
| 4 | 1.697 | 56 | $R_7=+115.4$ | $t_4=31.6$ |
|   |       |    | $R_8=-55.7$  |  |

*Table 2*
[Equivalent Focus=100 mm. $f/1.4$]

| Lens | N | V | Radii, mm. | Thicknesses, mm. |
|---|---|---|---|---|
| 1 | 1.697 | 56 | $R_1=+258.4$ | $t_1=20.1$ |
|   |       |    | $R_2=-258.4$ | $S_1=1.5$ |
| 2 | 1.697 | 56 | $R_3=+48.6$  | $t_2=17.1$ |
|   |       |    | $R_4=+87.81$ | $S_2=8.87$ |
| 3 | 1.720 | 29 | $R_5=-308.7$ | $t_3=12.2$ |
|   |       |    | $R_6=+37.3$  | $S_3=8.64$ |
| 4 | 1.697 | 56 | $R_7=+93.75$ | $t_4=31.7$ |
|   |       |    | $R_8=-62.7$  |  |

In these tables and in the drawing the lenses are numbered in order from front to rear; N is the index of refraction of the glass for the D-line of the spectrum, and V is the dispersive index of the glass (Abbé number); the radii of curvature R, airspaces S, and thicknesses t, all numbered in order from front to rear, are given in millimeters for a focal length of 100 mm. For any desired focal length all dimensions are scaled in the same ratio as the desired focal length bears to 100 mm. The diaphragm D, if used, is placed approximately 0.1 F in front of the front surface, labeled R.

Objectives constructed according to the data of these tables perform well at as aperture of $f/1.4$ and an angular field of $\pm 16°$. It will be observed that the maximum aperture could not be increased appreciably because the peripheries of the three rear lens elements are in contact, or nearly in contact, at the aperture $f/1.4$.

Having thus described our invention with reference to particular examples thereof, it is pointed out that the invention is not limited to the examples, but is of the scope of the appended claims.

We claim:

1. An objective having numerical data substantially as set forth in the following table:

| Lens | $N_D$ | V | Radii | Thicknesses |
|---|---|---|---|---|
| 1 | 1.697 | 56 | $R_1=+2.89F$ | $t_1=.20F$ |
|   |       |    | $R_2=-2.89F$ | $S_1=.014F$ |
| 2 | 1.697 | 56 | $R_3=+.54F$  | $t_2=.17F$ |
|   |       |    | $R_4=+1.33F$ | $S_2=.084F$ |
| 3 | 1.720 | 29 | $R_5=-1.39F$ | $t_3=.099F$ |
|   |       |    | $R_6=+.42F$  | $S_3=.091F$ |
| 4 | 1.697 | 56 | $R_7=+1.15F$ | $t_4=.32F$ |
|   |       |    | $R_8=-.56F$  |  | in which F is the equivalent focus of the objective, the lens elements are numbered in order from front to rear in the first column, the refractive indices N for the D line of the spectrum are given in the second column, the conventional dispersive indices V are given in the third column, the radii of curvature R of the surfaces, the spaces S between the elements, and the thicknesses t, all numbered from front to rear by subscripts, are given in the last two columns and + and − signs associated with the radii indicate surfaces convex and concave, respectively, to the front of the objective and where F is the equivalent focal length of the objective.

2. An objective having numerical data substantially set forth in the following table:

| Lens | $N_D$ | V | Radii | Thicknesses |
|---|---|---|---|---|
| 1 | 1.697 | 56 | $R_1=+2.58F$ | $t_1=.20F$ |
|   |       |    | $R_2=-2.58F$ | $S_1=.02F$ |
| 2 | 1.697 | 56 | $R_3=+.49F$  | $t_2=.17F$ |
|   |       |    | $R_4=+.88F$  | $S_2=.089F$ |
| 3 | 1.720 | 29 | $R_5=-3.09F$ | $t_3=.12F$ |
|   |       |    | $R_6=+.37F$  | $S_3=.086F$ |
| 4 | 1.697 | 56 | $R_7=+.94F$  | $t_4=.32F$ |
|   |       |    | $R_8=-.63F$  |             | in which F is the equivalent focus of the objective, the lens elements are numbered in order from front to rear in the first column, the refractive indices N for the D line of the spectrum are given in the second column, the conventional dispersive indices V are given in the third column, the radii of curvature R of the surfaces, the spaces S between the elements, and the thicknesses t, all numbered from front to rear by subscripts, are given in the last two columns and + and − signs associated with the radii indicate surfaces convex and concave, respectively, to the front of the objective and where F is the equivalent focal length of the objective.

3. A four component objective of aperture greater than f/2.0 and covering an angular field of half angle less than 18° with the aperture stop for the objective located in front of the front element, comprising a biconcave element, two positive elements aligned in front of the biconcave element and a biconvex element aligned behind the concave element with the air space between the latter two elements being less than 1/3 the thickness of the biconvex element, each of the elements having an axial thickness greater than 0.099 F and each of the axial air spaces between adjacent elements being less than 0.1 F, where F is the focal length of the objective, the positive element immediately in front of the biconcave element being meniscus and concave toward the biconcave element, and in which each element has an index of refraction between 1.65 and 1.75, the biconcave element has a dispersive index less than 35 and the other three elements have dispersive indices between 55 and 60.

References Cited in the file of this patent

UNITED STATES PATENTS

| 2,297,452 | Berek et al. | Sept. 29, 1942 |
| 2,432,387 | Creighton | Dec. 9, 1947 |
| 2,502,509 | Cook | Apr. 4, 1950 |
| 2,962,930 | Johnson | Dec. 6, 1960 |
| 3,011,402 | Johnson | Dec. 5, 1961 |

FOREIGN PATENTS

| 411,322 | Great Britain | June 7, 1934 |